United States Patent
Greaves

(10) Patent No.: US 8,247,501 B2
(45) Date of Patent: Aug. 21, 2012

(54) LUBRICANT COMPOSITIONS AND METHODS OF MAKING SAME

(75) Inventor: Martin R. Greaves, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 434 days.

(21) Appl. No.: 12/523,116

(22) PCT Filed: Jan. 14, 2008

(86) PCT No.: PCT/US2008/050988
§ 371 (c)(1),
(2), (4) Date: Jul. 14, 2009

(87) PCT Pub. No.: WO2008/089130
PCT Pub. Date: Jul. 24, 2008

(65) Prior Publication Data
US 2010/0009877 A1    Jan. 14, 2010

Related U.S. Application Data

(60) Provisional application No. 60/880,743, filed on Jan. 17, 2007.

(51) Int. Cl.
*C08L 71/02* (2006.01)
(52) U.S. Cl. ............... 525/403; 508/243; 508/246
(58) Field of Classification Search .......... 525/403; 508/243, 246
See application file for complete search history.

(56) References Cited

U.S. PATENT DOCUMENTS

| | | | |
|---|---|---|---|
| 2,825,693 A * | 3/1958 | Reamer et al. | 508/174 |
| 4,481,367 A | 11/1984 | Knopf | |
| 4,606,837 A | 8/1986 | McEntire et al. | |
| 4,781,847 A | 11/1988 | Weitz | |
| 4,828,735 A | 5/1989 | Minagawa et al. | |
| 4,855,070 A | 8/1989 | Lewis | |
| 4,900,463 A | 2/1990 | Thomas et al. | |
| 5,019,291 A | 5/1991 | Faulks | |
| 5,286,300 A | 2/1994 | Hnatin et al. | |
| 2006/0217275 A1 * | 9/2006 | Imai et al. | 508/321 |

FOREIGN PATENT DOCUMENTS

| | | |
|---|---|---|
| CA | 2063278 A1 | 12/1992 |
| EP | 0109515 A2 | 5/1984 |
| EP | 109515 A2 * | 5/1984 |
| EP | 0131657 A1 | 1/1985 |
| EP | 1705236 A2 | 9/2006 |
| WO | WO-2004071452 A2 | 8/2004 |
| WO | WO-2004096882 A1 | 11/2004 |
| WO | WO-2004106474 A1 | 12/2004 |
| WO | WO-2006019548 A1 | 2/2006 |

OTHER PUBLICATIONS

Journal of Polymer Science, Polymer Letters, vol. 6, (621) 1968.

* cited by examiner

*Primary Examiner* — Alicia Toscano

(57) ABSTRACT

Compositions are described that include a) from 15 weight percent to 60 weight percent of one or more random alkylene oxide interpolymers, each having a weight average molecular weight ranging from 250 g/mol to 2000 g/mol and comprising from 30 weight percent to 60 weight percent of polymer units derived from ethylene oxide; and b) from 40 weight percent to 85 weight percent of one or more alkylene oxide block interpolymers, each having a weight average molecular weight ranging from 1500 g/mol to 4000 g/mol and comprising from 40 weight percent to 90 weight percent propylene oxide blocks. The compositions have a first viscosity in the absence of water and a second viscosity that is at least 60 percent of the first viscosity when at least 10 weight percent water is present. Methods of lubricating surfaces, particularly, marine bearing surfaces with such compositions, are also described.

14 Claims, No Drawings

LUBRICANT COMPOSITIONS AND METHODS OF MAKING SAME

This application claims the benefit of U.S. Provisional Application No. 60/880,743 filed Jan. 17, 2007.

Embodiments of the invention generally relate to lubricant compositions. Specifically, embodiments of the invention relate to lubricant compositions suitable for use as stern tube lubricants in ocean-going and other marine vessels.

Lubricants are widely used in the marine industry to lubricate the bearings of various ship assemblies, particularly bearings in stern drives. Compositions that are suitable for such uses should have certain minimum properties to be useful. First, they should have a viscosity that provides acceptable lubrication over a wide temperature range. Another important property for such lubricants is their ability to maintain lubricity in the presence of up to 50 weight percent water, especially sea water. As more and more ships travel the oceans and other waterways, lubricants should also be biodegradable. Some formulated conventional lubricant compositions meet one or more of these standards. But when such conventional lubricant compositions leak from a ship's stern drive assembly, they cause a sheen on the surface of water thereby implying a pollution hazard even when the lubricant composition is biodegradable. Thus, compositions that balance suitable lubricant properties, maintain those properties in the presence of water, and form reduced amounts of sheen on the surface of water would be useful.

Embodiments of the invention provide a polymer composition that includes a) from 15 weight percent (wt. %) to 60 wt. %, based upon composition weight, of one or more random alkylene oxide interpolymers, each of which has a weight average molecular weight ($M_w$) ranging from 250 grams per mole (g/mol) to 2000 g/mol and comprises from 30 wt. % to 60 wt. %, based upon random interpolymer weight, of polymer units derived from ethylene oxide (EO); and b) from 40 wt. % to 85 wt. %, based upon composition weight, of one or more alkylene oxide (AO) block interpolymers, each of which has a $M_w$ ranging from 1500 g/mol to 4000 g/mol and comprises from 40 wt. % to 90 wt. %, based upon block copolymer weight, of blocks derived from propylene oxide (PO). The amounts of the components are based upon total composition weight and when taken together total 100 wt. %. The compositions have a first viscosity in the absence of water and a second viscosity in the presence at least ($\geq$) 10 wt. % water based upon combined weight of composition and water. The second viscosity has a value that is at $\geq$60 percent of the value of the first viscosity, wherein the first and second viscosities are determined according to American Society for Testing and Materials (ASTM) D-445 at 40 degrees centigrade (° C.). Such compositions may be used in a method of lubricating a surface and methods of reducing sheen on the surface of water due to leakage of lubricant from a marine vessel. The methods include a) selecting a composition comprising the appropriate amounts of the one or more random AO interpolymers and the one or more AO block interpolymers; and b) providing the composition to the surface. Some methods are particularly suitable for lubricating stern tube bearings of a marine vessel or fin stabilizer bearings of a marine vessel.

In particular embodiments, the compositions having desirable viscosity characteristics include a) from 40 wt. % to 60 wt. % of one or more random AO interpolymers, comprising from 50 wt. % to 55 wt. % of polymer units derived from EO; and b) from 40 wt. % to 60 wt. % of one or more AO block interpolymers having from 40 wt. % to 90 wt. % of polymer units derived from PO; wherein the compositions have a first viscosity in the absence of water and a second viscosity in the presence of at least 10 wt. % of water based upon combined weight of composition and water. Amounts of a) and b), when taken together, total 100 wt. %. The second viscosity has a value that is $\geq$60 percent (%) of the value of the first viscosity, wherein the first and second viscosities are determined according to ASTM D445 at 40° C. Preferably, some compositions include two random AO interpolymers.

Polymers described herein are sometimes referred to by their weight average molecular weight, or $M_w$. $M_w$ may be determined from Gel Permeation Chromatography (GPC) data according to the following formula:

$$Mj = (\Sigma w_i (M_i^j))^j;$$

where $w_i$ is the weight fraction of the molecules with molecular weight $M_i$ eluting from the GPC column in fraction i and j=1. Details related to the determination of polymer molecular weights are discussed in Williams and Ward in the Journal of Polymer Science, Polymer Letters, Vol. 6, (621) 1968.

Embodiments of the invention provide a polymer composition wherein one or more random AO interpolymers are combined with one or more AO block interpolymers to provide a composition comprising 15 wt. % to 60 wt. % of the random AO interpolymer and 40 wt. % to 85 wt. % of the block AO interpolymer. Unless otherwise indicated all amounts herein are based on the weight of the recited components as described below.

AO block interpolymers useful in the embodiments of the invention include blocks or segments derived from at least two monomers of formula I.

Formula I:

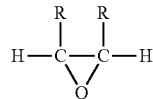

in which each R, independently, is hydrogen, a $C_1$-$C_6$ (one to six carbon atoms) alkyl or haloalkyl radical, or in which the two R substituents together with both vicinal epoxy carbons form a saturated or monoethylenically unsaturated cycloaliphatic hydrocarbon ring, preferably of five or six carbon atoms. Some AO monomers contain 2 to 12 carbon atoms ($C_2$-$C_{12}$), and representative AO monomers include ethylene oxide (EO), propylene oxide (PO), the butylene oxides (BO), 1,2-epoxydodecane, cyclopentene oxide, cyclohexene oxide, and styrene oxide. Polymers having blocks derived from EO monomers and blocks derived from PO monomers represent preferred AO block interpolymers herein. Such block interpolymers are generally prepared by the sequential polymerization of monomer types as is known in the art. In some embodiments, AO block interpolymers are made using a propylene glycol (1,2-propane diol), also referred to as monopropylene glycol, initiator wherein a PO mid block is first formed followed by terminal EO blocks. Alternatively, dipropylene glycol may be used as an initiator.

Alternatively, block interpolymers can be described as including at least one block of a first AO and at least one block of a second AO. This includes, for example, a single EO block and a single PO block. Block copolymers may also include those that have two blocks of a first AO sandwiching a single block of a second AO as in $(EO)_a(PO)_b(EO)_c$ or $(PO)_d(EO)_e(PO)_f$, where the variables a through f denote the number of repeat units of the individual alkylene oxide blocks in the interpolymer. Of course, block interpolymers having blocks formed from at least one additional alkylene oxide as well as alternating block copolymers with four or more alkylene oxide units are envisioned. Preferred block interpolymers have three blocks (also known as triblock polymers), with a central block of one alkylene oxide and terminal blocks of another alkylene oxide.

Both conventional block interpolymers and so-called "reverse block" polymers may be useful. Typically, the terms "block" and "reverse block" refer to the arrangement of the polymer blocks within the polymer molecules. For illustrative purposes only, an EO/PO system demonstrates these two classes of polymers. Where block interpolymers having more than two blocks are considered, conventional block EO/PO polymers comprise terminal EO blocks and an intermediate block derived from PO. Such a polymer is sometimes referred to as an EO/PO/EO block polymer. Reverse block ethylene oxide/propylene oxide copolymers comprise terminal blocks derived from PO and an intermediate block derived from EO and are sometimes referred to as PO/EO/PO block polymers. A block interpolymer having units derived from EO, PO, and BO would be considered a conventional block interpolymer if the terminal blocks comprise EO, designated EO/PO/BO/EO. Typically, conventional triblock EO/PO block interpolymers are preferred. Block copolymers are described in Non-Ionic Surfactants & Polyoxyalkylene Block Copolymers, Surfactant Science Series, Vol. 60 (Vaugh M. Nace, ed, Marcel Dekker Inc.), incorporated herein by reference in its entirety.

With respect to the block structure, the designation of a block polymer as either a conventional block copolymer or reverse block copolymer coupled with the one or more comonomer content value, and the overall molecular weight defines the size and type of blocks that may be present. While blocks of units derived from a particular monomer are generally of substantially the same size, this need not be the case. For example, while a conventional block or "reverse block" interpolymer typically has terminal blocks of substantially the same number of polymer units, asymmetric block polymers or those having terminal blocks that have substantially different number of polymer units with respect to each other may be useful.

The AO block interpolymers present in compositions of the present invention can comprise from 40 wt. % to 85 wt. % of such compositions, based upon total composition weight. In particular compositions, the lower limit on the AO block interpolymer in the composition is 45 wt. %, 50 wt. %, 55 wt. %, 60 wt. %, 65 wt. %, 70 wt. %, or 75 wt. %. The upper limit of the range of AO block interpolymer in some embodiments is 50 wt. %, 55 wt. %, 60 wt. %, 65 wt. %, 70 wt. %, 75 wt. %, or 80 wt. %. Some useful compositions include from 50 wt. % to 75 wt. %. Other useful compositions include from 40 wt. % to 60 wt. % based upon total composition weight. In still other compositions, the alkylene oxide block interpolymer comprises from 50 wt. % to 55 wt. % of the composition. The relative amounts of the block AO interpolymer in the composition are determined with respect to the amounts of each of the random AO interpolymers and each of the block AO interpolymers present in the composition according to the equation:

$$\frac{\sum W_{block,i}}{\sum W_{random,i} + \sum W_{block,i}}$$

wherein $W_{block,i}$ represents the weight of each block AO interpolymer present in the composition and $W_{random,i}$ represents the weight of each random AO interpolymer present in the composition.

AO block interpolymers used in embodiments of the invention preferably have a $M_w$ ranging from 1500 g/mol to 4000 g/mol. In some embodiments, the AO block interpolymers have a $M_w$ of from 1500 g/mol to 3000 g/mol, preferably from 1750 g/mol to 2250 g/mol, more preferably from 1850 g/mol to 2150 g/mol, and still more preferably from 1900 g/mol to 2100 g/mol.

Suitable AO block interpolymers typically have 40 wt. % to 90 wt. % of polymer units derived from PO. Some preferred AO block interpolymers have from 85 wt. % to 90 wt. % of polymer units derived from PO. In particular compositions, the AO block interpolymer comprises from 65 wt. % to less than 85 wt. % of polymer units derived from PO. In some compositions, the block AO interpolymer is an EO/PO polymer, particularly those with less than 50 wt. % of polymer units derived from EO, more particularly those with from 10 wt. % to less than 50 wt. % of polymer units derived from EO, and still more particularly those with from 10 wt %. to less than 35 wt. % of polymer units derived from EO. Thus, in some embodiments, the AO block interpolymer includes polymer units derived from EO and PO wherein from greater than 70 wt. % to 90 wt. %, preferably greater than 80 wt. % or 85 wt. % to 90 wt. %, of the polymer units are derived from PO. Some such polymers are commercially available from The Dow Chemical Company under the Dowfax™ and Tergitol™ brands.

The random AO interpolymer preferably have polymerized therein at least the same AO monomers as are present in the block copolymers. In contrast to block interpolymers, random polymers are generally prepared from a reaction mixture having present therein each of the constituent monomers in their desired amounts during the polymerization. Consequently, the structures of the individual polymer molecules have a random distribution of units derived from each of the monomers present during the process. Random AO interpolymers having units derived from any number of different monomers of Formula I may be used. Typically, the random AO interpolymer have units derived from two or three such monomers, with EO, PO, and BO monomers being preferred. In some embodiments, random EO/PO polymers are used. Random copolymers are described in detail in *Synthetic Lubricants & High Performance Functional Fluids*, Leslie Rudnick and Ronald Shubkin, eds., 2$^{nd}$ ed., incorporated herein by reference in its entirety. The random AO interpolymers can comprise from 15 wt. % to 60 wt. % of the composition, but preferably comprise from 40 wt. % to 60 wt. %, more preferably 50 wt. % to 55 wt. %, of the composition.

$$\frac{\sum W_{random,i}}{\sum W_{random,i} + \sum W_{block,i}}$$

Particular embodiments include one or more random AO interpolymers with a $M_w$ ranging from 250 g/mol to 2000 g/mol, particularly from 250 g/mol to 1200 g/mol, preferably from 250 g/mol to 1000 g/mol. Typically, the random AO interpolymer has from 30 wt. % to 60 wt. % of polymer units derived from EO. In particular embodiments, the random AO interpolymer has from 40 wt. % to 60 wt. %, preferably from 50 wt. % to 55 wt. % polymer units derived from EO. In some compositions, two or more, preferably only two, of such random AO interpolymers are used.

In particular embodiments, the compositions comprise from 40 wt. % to 60 wt. % of one or more random EO/PO interpolymers having a $M_w$ ranging from 250 g/mol to 1200 g/mol and having from 40 wt. % to 60 wt. % of the polymer units derived from EO and one or more block EO/PO interpolymers having a $M_w$ ranging from 1750 g/mol to 2500 g/mol and having from 40 wt. % to 90 wt. % of the polymer units derived from PO. Some such polymers are commercially available from The Dow Chemical Company under the UCON® and Synalox™ brands.

The random and block interpolymers described herein can be combined by any convenient method. Generally, the $M_w$'s of the components are low enough that the compositions can be prepared by any suitable method for mixing liquids. For industrial scale preparation, the amounts of desired random and block interpolymer components can be provided to a stainless steel mixing vessel and stirred at a temperature typically between ambient temperature (nominally 25° C.) and 60° C. Blending may be accomplished in one or more steps. In addition, additives may be blended with the composition in any desirable manner, such as being blended contemporaneously with one or more interpolymer components or they may be provided in smaller portions or aliquots at intermediate stages of the blending process.

Some compositions are characterized by desirable viscosity behavior in the presence of relatively large amounts of water. Thus, some compositions have a first viscosity in the substantial absence of water and an acceptable second viscosity when combined with water. Typically, the first viscosity ranges from 50 centistokes (cSt) ($5\times10^{-5}$ square meters per second ($m^2/sec$)) to 150 cSt ($15\times10^{-5}$ $m^2/sec$), preferably from 50 cSt ($5\times10^{-5}$ $m^2/sec$) to 120 cSt ($12\times10^{-5}$ $m^2/sec$), and more preferably from 70 cSt ($7\times10^{-5}$ $m^2/sec$) to 110 cSt ($11\times10^{-5}$ $m^2/sec$). In some embodiments, the second viscosity, as determined when the amount of water present ranges from 10 wt. % to 50 wt. %, based upon composition weight, has a value that is at least 60 percent of the value of the first viscosity. For example, some compositions have a first viscosity in the absence of water, and then in the presence of 20 wt. % water, the mixture of the polymer composition and water has second viscosity that is ≧60% of the value of the viscosity when water is absent. In other compositions, the second viscosity is ≧60% of the value of the first viscosity when the composition includes 30 wt. % water, 40 wt. % water or even 50 wt. % water. Some compositions are characterized by a value of the second viscosity that is ≧80% of the value of the first viscosity when the composition includes 40 wt. % water. In other compositions, the second viscosity has a value that is ≧90% of the first viscosity when composition includes 40 wt. % water.

While the viscosity of the mixtures of the block and random alkylene oxide interpolymer components generally decreases when water is present, some compositions show an increase in viscosity in the presence of relatively small amounts of water. Thus, some preferred compositions have a second viscosity that is up to 11% greater than the first viscosity when the amount of water present is 5 wt. %.

Particular polymer compositions having one or more of the improved viscosity properties described above comprise from 40 wt. % to 60 wt. %, based upon composition weight, of at least one random AO interpolymer, each random interpolymer comprising from 50 wt. % to 55 wt. % of polymer units derived from EO; and from 40 wt. % to 60 wt. %, based upon composition weight, of at least one AO block interpolymer. Particularly useful compositions are prepared by providing two random EO/PO interpolymers that are present in an amount totaling from 40 wt. % to 60 wt. %.

While the compositions may be used to lubricate any bearing on a marine vessel, lignum vitae bearings, metal bearings and Cedervall type bearings are most common.

EXAMPLES

The following examples recorded in Tables 1-13 below are prepared by combining one or more of the following components. Polymers A, C, F, G, K, L and T include no viscosity profile data.

Polymer A is a triblock EO/PO interpolymer having a $M_w$ of 3910 g/mol and a PO content of 85 wt. %, based upon copolymer weight.

Polymer B is a triblock EO/PO interpolymer having a $M_w$ of 2800 g/mol and a PO content of 85 wt. % based upon copolymer weight. Polymer B has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cST)/ ($\times 10^{-5} m^2/sec$) | 254.5/ 25.4 | 365.9/ 36.6 | — | — | — | — |

"—" denotes that the viscosity was not determined.

Polymer C is a butanol-initiated random EO/PO interpolymer in which the EO content is 50 wt. %, based upon copolymer weight, with a $M_w$ of 270 g/mol.

Synthesis of butanol-initiated random EO/PO interpolymers (Polymers C and D), diol-initiated random EO/PO interpolymers (Polymers E and I), monopropylene glycol-initiated EO/PO triblock interpolymers (Polymers M, N, O, P and Q), trimethylolpropane-initiated EO/PO diblock copolymers (Polymer R), and glycerol-initiated EO/PO reverse diblock copolymers (Polymers S and T) involves a chemical reaction of EO and PO with an initiator that contains a reactive hydrogen atom, e.g. butanol for Polymers C and D.

Polymer D is a butanol-initiated random EO/PO interpolymer with an EO ethylene oxide content of 50 wt. %, based upon copolymer weight, and a $M_w$ of 970 g/mol. Polymer D has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cST)/ ($\times 10^{-5} m^2/sec$) | 52.2/ 5.22 | 53.4/ 5.34 | 43.7/ 4.37 | 32.9/ 3.29 | 29.5/ 2.95 | 18.8/ 1.88 |

Polymer E is a diol-initiated random EO/PO interpolymer with a $M_w$ of about 1600 g/mol and an EO content of 45 wt. %, based upon copolymer weight. Polymer E has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cST)/ ((×10$^{-5}$ m$^2$/sec)) | 96.1/ 9.61 | 100.3/ 10.03 | 84.5/ 8.45 | 66/ 6.6 | 46/ 4.6 | 28/ 2.8 |

Polymer F is a triblock EO/PO interpolymer having a $M_w$ of 2500 g/mol and a PO content of 70 wt. %, based upon copolymer weight.

Polymer G is a triblock EO/PO interpolymer having a $M_w$ of 2750 g/mol and a PO content of 85 wt. %, based upon copolymer weight.

Polymer H is a triblock EO/PO interpolymer having a $M_w$ of 2600 g/mol and a PO content of 87 wt. %, based upon copolymer weight. Polymer H has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cST)/ (×10$^{-5}$ m$^2$/sec) | 226.5/ 22.65 | 334.2/ 33.42 | —* | —* | —* | —* |

*"—" denotes that the viscosity was not determined.

Polymer I is a diol-initiated random EO/PO copolymer with an EO content of is 60 wt. %, based upon copolymer weight, with a $M_w$ of 1000 g/mol. Polymer I has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cST)/ (×10$^{-5}$ m$^2$/sec) | 72.9/ 7.29 | 68.3/ 6.83 | 53.9/ 5.39 | 34.2/ 3.42 | 19.5/ 1.95 | 15.9/ 1.59 |

Polymer J is a triblock EO/PO interpolymer having a $M_w$ of 2300 g/mol and a PO content of 70 wt. %, based upon copolymer weight. Polymer J has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cST)/ (×10$^{-5}$ m$^2$/sec) | 197.2/ 19.72 | 269.8/ 26.98 | 313.1/ 31.31 | — | 671.0/ 67.1 | 141.6/ 14.16 |

"—" denotes not determined.

Polymer K is a polyol ester lubricant, available from Hatco as HATCOL 5068. It has a viscosity at 40° C. of 68 cSt, (6.8×10$^{-5}$ m$^2$/sec), a viscosity at 100° C. of 9 cSt (0.9×10$^{-5}$ m$^2$/sec); a pour point of −37° C., an open cup flash point of 237° C. Because Polymer K forms an immiscible mixture when water is present between 1 wt. % and 50 wt. %, the viscosity in the presence of water is not determined.

Polymer L is a rapeseed oil-based lubricant having a viscosity at 40° C. of 31 cSt (3.1×10$^{-5}$ m$^2$/sec), a viscosity at 100° C. of 9 cSt (0.9×10$^{-5}$ m$^2$/sec); and a density at 15° C. of 930 Kg/m$^3$ and flash point in excess of (>) 220° C. This fluid has an initial viscosity of 28 cSt (2.8×10$^{-5}$ m 2/sec) at 40° C. Because Polymer L forms an immiscible mixture when water is present between 10 wt. % and 50 wt. %, the viscosity in the presence of water is not determined.

Polymer M is a monopropylene glycol-initiated EO/PO triblock interpolymer (sometimes referred to as an EO/PO triblock copolymer) having a $M_w$ of 2400 g/mol and a PO content of 60 wt. %, based upon copolymer weight. Polymer M has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cSt)/ (×10$^{-5}$ m$^2$/sec) | 248.7/ 24.87 | 301.3/ 30.13 | —* | —* | —* | —* |

"—" denotes not determined.

Polymer N is a monopropylene glycol-initiated EO/PO triblock copolymer having a $M_w$ of 1900 g/mol and an EO content of 90 wt. %, based upon copolymer weight. Polymer N has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cSt)/ (×10$^{-5}$ m$^2$/sec) | 152/ 15.2 | 169.3/ 16.93 | — | — | — | — |

"—" denotes not determined.

Polymer 0 is a monopropylene glycol-initiated EO/PO triblock copolymer having a $M_w$ of 2000 g/mol and a PO content of 85 wt. %, based upon copolymer weight. Polymer 0 has the following viscosity profile.

|  | 0 wt. % water | 10 wt. % water | 20 wt. % water | 30 wt. % water | 40 wt. % water | 50 wt. % water |
|---|---|---|---|---|---|---|
| Viscosity (cSt)/ (×10$^{-5}$ m$^2$/sec) | 154.9/15.49 | 195.2/19.52 | 276.9/27.69 | 362.5/36.25 | — | — |

"—" denotes not determined.

Polymer P is a monopropylene glycol-initiated EO/PO triblock copolymer having a $M_w$ of 2700 g/mol and a PO content of 90 wt. %, based upon copolymer weight. Polymer P has the following viscosity profile.

| | 0 wt. % water | 10 wt. % water | 20 wt. % water | 30 wt. % water | 40 wt. % water | 50 wt. % water |
|---|---|---|---|---|---|---|
| Viscosity (cStT)/ ($\times 10^{-5}$ m²/sec) | 220.3/22.03 | 396.1/39.61 | 629.3/62.93 | — | — | — |

"—" denotes not determined.

Polymer Q is a monopropylene glycol-initiated EO/PO triblock copolymer having a $M_w$ of 3800 g/mol and a PO content of 84 wt. %, based upon copolymer weight. Polymer Q has the following viscosity profile.

| | 0 wt. % water | 10 wt. % water | 20 wt. % water | 30 wt. % water | 40 wt. % water | 50 wt. % water |
|---|---|---|---|---|---|---|
| Viscosity (cSt)/ ($\times 10^{-5}$ m²/sec) | 310.2/31.02 | 1358.7/135.87 | —* | —* | —* | —* |

*"—"denotes not determined.

Polymer R is a trimethylolpropane-initiated EO/PO diblock copolymer having a $M_w$ of 4500 g/mol and a PO content of 10 wt. %, based upon copolymer weight. Polymer R has the following viscosity profile.

| | 0 wt. % water | 10 wt. % water | 20 wt. % water | 30 wt. % water | 40 wt. % water | 50 wt. % water |
|---|---|---|---|---|---|---|
| Viscosity (cSt)/ ($\times 10^{-5}$ m²/sec) | 351.4/35.14 | — | — | — | — | — |

"—" denotes not determined

Polymer S is a glycerol-initiated EO/PO reverse diblock copolymer having a $M_w$ of 4500 g/mol and a PO content of 87 wt. %, based upon copolymer weight. Polymer S has the following viscosity profile.

| | 0 wt. % water | 10 wt. % water | 20 wt. % water | 30 wt. % water | 40 wt. % water | 50 wt. % water |
|---|---|---|---|---|---|---|
| Viscosity (cSt)/ ($\times 10^{-5}$ m²/sec) | 293.9/29.39 | 309.5/30.95 | — | — | — | — |

"—" denotes not determined

Polymer T is a glycerol-initiated EO/PO reverse diblock copolymer having a $M_w$ of 3500 g/mol and a PO content of 65 wt. %, based upon copolymer weight.

The initial viscosity of the compositions is determined according to ASTM D-445 at 40° C. To determine the effect of water on the viscosity, a sample of each composition is combined with an amount of water sufficient to yield a diluted composition with a water content ranging from 10 wt. % to 50 wt. %, based upon diluted composition weight. For those samples that form a miscible mixture, the viscosity of the mixture is measured according to the same method. Generally, miscible mixtures have a clear appearance. An immiscible mixture is generally indicated by a cloudy mixture, or in extreme cases by separation of the phases. The viscosity of immiscible mixtures is not determined.

The following data are reported to demonstrate the viscosity characteristics and physical properties of various blends made from the above-described polymers. While some of the following examples fall within the compositional ranges of the invention, they may have viscosity profiles that are undesirable. Nevertheless, such examples should in no way be considered to limit the scope of protection afforded to compositions that otherwise fall within the claims but may not have been reported herein.

Examples of Table 2 are formulated compositions including conventional additive packages along with the block polymer and random polymer components. Typical additive packages include antioxidants and corrosion inhibitors such as a combination of (4-nonlyphenol)acetic acid, a proprietary acylsarkosinate and nonyl phenol (Irgacor® L17), N-phenyl-ar-(1,1,3,3-tetramethylbutyl)-1-naphthaleneamine Irganox® L06, a reaction product of N-phenylbenzenamine with 2,4,4--

TABLE 1

|  | Example 1 | Example 2 | Comparative Ex. 3 | Comparative Ex. 4 | Comparative Ex. 5 |
|---|---|---|---|---|---|
| Component 1 (wt. %) | Polymer A (50%) | Polymer B (50%) | Polymer I (100%) | Polymer E (100%) | Polymer K (100%) |
| Component 2 (wt. %) | Polymer C (50%) | Polymer C (10%) | not present | not present | not present |
| Component 3 (wt. %) | not present | Polymer D (40%) | not present | not present | not present |
| Viscosity ($\eta_i$) (40° C.), (cSt/($\times 10^{-5}$ m$^2$/sec)) | 67.4/6.74 | 102.4/10.24 | 72.8/7.28 | 96.1/9.61 | 68/6.8 |
| Viscosity (40° C.), 10% water) (cSt/($\times 10^{-5}$ m$^2$/sec) (%$\Delta\eta$) | 74.7/7.47 (10.8%) | 104.2/10.42 (1.8%) | 68.3/6.83 (−6.2%) | 100.3/10.03 (4.4%) | — |
| Viscosity (40° C., 20% water) (cSt/($\times 10^{-5}$ m$^2$/sec)) (%$\Delta\eta$) | 74.1/7.41 (9.9%) | 105/10.5 (2.5%) | 53.9/5.39 (−26.0%) | 84.5/8.45 (−12.1%) | — |
| Viscosity (40° C., 30% water) (cSt/($\times 10^{-5}$ m$^2$/sec)) (%$\Delta\eta$) | 71.7/7.17 (6.3%) | 104.1/10.41 (1.7%) | 34.2/3.42 (−53.0%) | 66/6.6 (−31.3%) | — |
| Viscosity (40° C., 40% water) (cSt/($\times 10^{-5}$ m$^2$/sec)) (%$\Delta\eta$) | 67.7/6.77 (0.4%) | 97.7/9.77 (−4.6%) | 19.4/1.94 (−73.4%) | 46/4.6 (−52.1%) | — |
| Viscosity (40° C., 50% water) (cSt/($\times 10^{-5}$ m$^2$/sec)) (%$\Delta\eta$) | 64.2/6.42 (−4.8) | 89.3/8.93 (−12.8% ) | 15.9/1.59 (−78.1%) | 28/2.8 (−70.9%) | — |

|  | Comparative Ex. 6 | Example 7 | Example 8 | Example 9 | Example 10 |
|---|---|---|---|---|---|
| Component 1 (wt. %) | Polymer J (100%) | Polymer F (60%) | Polymer F (57%) | Polymer J (60%) | Polymer G (50%) |
| Component 2 (wt. %) | not present | Polymer C (13%) | Polymer C (10%) | Polymer C (10%) | Polymer C (30%) |
| Component 3 (wt. %) | not present | Polymer D (27%) | Polymer D (33%) | Polymer D (30%) | Polymer D (20%) |
| Viscosity ($\eta_i$) (40° C.) (cSt/($\times 10^{-5}$ m$^2$/sec)) | 197.2/19.72 | 108/10.8 | 110/11.0 | 111/11.1 | 72.5/7.25 |
| Viscosity (40° C., 10% water) (cSt/($\times 10^{-5}$ m$^2$/sec)) (%$\Delta\eta$) | 269.8/26.98 (36.8%) | 113/11.3 (4.6%) | 112.1/11.21 (1.9%) | 117/11.7 (5.4%) | 74.7/7.47 (6.8%) |
| Viscosity (40° C., 20% water) (cSt/($\times 10^{-5}$ m$^2$/sec)) (%$\Delta\eta$) | 313.1/31.31 (58.8%) | 106/10.6 (−1.5%) | 102.5/10.25 (−6.8%) | 113.4/11.34 (2.2%) | 74.1/7.41 (4.0%) |
| Viscosity (40° C., 30% water) (cSt/($\times 10^{-5}$ m$^2$/sec)) (%$\Delta\eta$) | — | 88/8.8 (−18.5%) | 83.7/8.37 (−23.9%) | 113/11.3 (2.1%) | 71.7/7.17 (1.5%) |
| Viscosity (40° C., 40% water) (cSt/($\times 10^{-5}$ m$^2$/sec)) (%$\Delta\eta$) | 671.0/67.1 (240%) | 70/7.0 (−35.2%) | 65.5/6.55 (−40.0%) | 80.5/8.05 (−27.5%) | 67.7/6.77 (8.1%) |
| Viscosity (40° C., 50% water) (cSt/($\times 10^{-5}$ m$^2$/sec)) (%$\Delta\eta$) | 141.6/14.16 (−28.2%) | 52/5.2 (−51.9%) | 44.8/4.48 (−59.3%) | 75/7.5 (−32.4%) | 64.2/6.42 (20.2%) |

"—" denotes not determined.

trimethylpentent diphenylamine (Irganox® L57), tolyltriazole and monomethyl hydroquinone. Irganox® is a trademark of the Ciba Geigy Corporation. Additives may be used in any convenient combination or amount but typically comprise from 0.5 wt. % to 5 wt. %, preferably from 1 wt. % to 3 wt. %, of the total composition. One preferred additive package comprises 0.9 wt. % Irgacor® L17, 0.25 wt. % Irganox® L06, 0.25 wt. % Irganox® L57, 0.1 wt. % tolyltriazole and 0.5 wt. % monomethyl hydroquinone, each wt. % being based upon total composition weight.

TABLE 2

|  | Example 11* | Example 12* | Comparative Ex. 13* |
|---|---|---|---|
| Component 1 (wt. %) | Polymer J (60%) | Polymer H (50%) | Polymer I (98.0%) |
| Component 2 (wt. %) | Polymer C (13%) | Polymer C (9%) | not present |
| Component 3 (wt. %) | Polymer D (25%) | Polymer D (39%) | not present |
| Viscosity ($\eta_t$) (40° C.) (cSt/(×10$^{-5}$ m$^2$/sec)) | 97.6/ 9.76 | 97.8/ 9.78 | 65.2/ 6.52 |
| Viscosity (40° C. ((cSt/(×10$^{-5}$ m$^2$/sec)), 10% water | 99.3/ 9.93 | 100.6/ 10.06 | 63/ 6.3 |
| Viscosity (40° C.), (cSt/(×10$^{-5}$ m$^2$/sec)), 20% water | 90.1/ 9.01 | 100.4/ 10.04 | 47.9/ 4.79 |
| Viscosity (40° C.) (cSt/(×10$^{-5}$ m$^2$/sec)), 30% water | 76.1/ 7.61 | 98.8/ 9.88 | 32.3/ 3.23 |
| Viscosity (40° C.) (cSt/(×10$^{-5}$ m$^2$/sec)), 40% water | 58.7/ 5.87 | 93.1/ 9.31 | 20/ 2.0 |
| Viscosity (40° C.) (cSt/(×10$^{-5}$ m$^2$/sec)), 50% water | 43.4/ 4.34 | 49/ 4.9 | 11.1/ 1.11 |
| Pour Point, ° C. (ASTMD97) | −17 | −40 | −38 |
| Flash Point, F (ASTM D92) | 445 | 525 | 410 |
| Solubility (10%) in deionized water | Clear | Clear | Clear |
| Solubility (10%) in sea water | Clear | Hazy | Clear |
| Corrosion Performance (ASTM D665A) | Pass | Pass | Pass |
| Rotary Bomb Oxidation Test, mins (ASTM D2272) | 370 | 390 | 350 |
| Biodegradability (OECD 302B) | Estimated to be >60% based on biodegradability of individual components | Estimated to be >60% based on biodegradability of individual components | Estimated to be >60% based on biodegradability of individual components |

*Examples 11-13 include 0.9 wt. % Irgacor ® L17, 0.25 wt. % Irganox ® L06, 0.25 wt. % Irganox ® L57, 0.1 wt. % tolyltriazole and 0.5 wt. % monomethyl hydroquinone, each wt. % being based upon total composition weight.

TABLE 3

| Example 14 | wt. %, | wt. % | wt. % | wt. % | wt. % | wt. % | wt. % |
|---|---|---|---|---|---|---|---|
| Polymer H | 100* | 80 | 60 | 50 | 40 | 20* | 0* |
| Polymer D | 0 | 20 | 40 | 50 | 60 | 80 | 100 |
| Viscosity (cSt/(×10$^{-5}$ m$^2$/sec)), 0% water added | 226.5/ 22.65 | 166.5/ 16.65 | 139.7/ 13.97 | 111.9/ 11.19 | 98.7/ 9.87 | 76.2/ 7.62 | 52.2/ 5.22 |
| Appearance | Clear | Clear | Clear | Clear | Clear | Clear | Clear |
| Viscosity (cSt/(×10$^{-5}$ m$^2$/sec)), 10% water added | 334.2/ 33.42 | 193.7/ 19.37 | 143.9/ 14.39 | 117.7/ 11.77 | 100.6/ 10.06 | 73.1/ 7.31 | 53.5/ 5.35 |
| Appearance | Clear | Clear | Clear | Clear | Clear | Clear | Clear |
| Viscosity (cSt/(×10$^{-5}$ m$^2$/sec)), 20% water added | — | 312.5/ 31.25 | 179.7/ 17.97 | 115.3/ 11.53 | 93.8/ 9.38 | 59.2/ 5.92 | 43.8/ 4.38 |
| Appearance | Separated haze gel | Clear | Clear | Clear | Clear | Clear | Clear |
| Viscosity (cSt/(×10$^{-5}$ m$^2$/sec)), 30% water added | — | 399.7/ 39.97 | 180.1/ 18.01 | 111.9/ 11.19 | 85.3/ 8.53 | 48.4/ 4.84 | 32.9/ 3.29 |

TABLE 3-continued

| Example 14 | wt. %, | wt. % | wt. % | wt. % | wt. % | wt. % | wt. % |
|---|---|---|---|---|---|---|---|
| Appearance | Separated haze gel | Clear | Clear | Clear | Clear | Clear | Clear |
| Viscosity (cSt/($\times 10^{-5}$ m$^2$/sec)), 40% water added | — | — | 228.5/ 22.85 | 103.1/ 10.31 | 73.6/ 7.36 | 34.7/ 3.47 | 29.5/ 2.95 |
| Appearance | Separated haze gel | Separated haze | Clear | Clear | Clear | Clear | Clear |
| Viscosity ((cSt/($\times 10^{-5}$ m$^2$/sec)), 50% water added | — | — | — | 65.1/ 6.51 | 65.1/ 6.51 | 22.0/ 2.20 | 18.9/ 1.89 |
| Appearance | Separated cloudy | Separated haze | Slight haze | Separated haze | Slight haze | Clear | Clear |

"—" denotes not determined.

"*" denotes a comparative composition, not part of the invention.

TABLE 4

| | wt. % | wt. % | wt. % | wt. % | wt. % | wt. % | wt. % |
|---|---|---|---|---|---|---|---|
| Example 15 | | | | | | | |
| Polymer Q | 100* | 80* | 60 | 50 | 40 | 20* | 0* |
| Polymer D | 0 | 20 | 40 | 50 | 60 | 80 | 100 |
| Viscosity (cSt/ ($\times 10^{-5}$ m$^2$/sec)), 0% water added | 310.2/ 31.02 | 255.6/ 25.56 | 172.3/ 17.23 | 142.9/ 14.29 | 117.8/ 11.78 | 82.8/ 8.28 | 52.2/ 5.22 |
| Appearance | Clear | Clear | Clear | Clear | Clear | Clear | Clear |
| Viscosity (cSt/ ($\times 10^{-5}$ m$^2$/sec)), 10% water added | 1358.7/ 135.87 | 456.8/ 45.68 | 179.7/ 17.97 | 145.0/ 14.50 | 114.9/ 11.49 | 80.5/ 8.05 | 53.5/ 5.35 |
| Appearance | Clear Gel | Clear | Clear | Clear | Clear | Clear | Clear |
| Viscosity (cSt/ ($\times 10^{-5}$ m$^2$/sec)), 20% water added | — | — | 220.7/ 22.07 | 161.9/ 16.19 | 114.4/ 11.44 | 67.8/ 6.78 | 43.8/ 4.38 |
| Appearance | Separated clear gel | Separated clear gel | Clear | Clear | Clear | Clear | Clear |
| Viscosity (cSt/ ($\times 10^{-5}$ m$^2$/sec)), 30% water added | — | — | 278.1/ 27.81 | 184.4/ 18.44 | 110.2/ 11.02 | 53.1/ 5.31 | 32.9/ 3.29 |
| Appearance | Separated clear gel | Separated clear gel | Clear | Clear | Clear | Clear | Clear |
| Viscosity (cSt/ ($\times 10^{-5}$ m$^2$/sec)), 40% water added | — | — | — | 181.4/ 18.14 | 102.4/ 10.24 | 38.8/ 3.88 | 29.5/ 2.95 |
| Appearance | Separated cloudy gel | Separated cloudy gel | Separated clear gel | Clear | Clear | Clear | Clear |
| Viscosity (cSt/ ($\times 10^{-5}$ m$^2$/sec)), 50% water added | — | — | — | 150.3/ 15.03 | 92.4/ 9.24 | 25.9/ 2.59 | 18.9/ 1.89 |
| Appearance | Separated cloudy gel | Separated cloudy | Separated cloudy | Clear | Clear | Clear | Clear |
| Example 16 | | | | | | | |
| Polymer Q | 100* | 80* | 60 | 50 | 40 | 20* | 0* |
| Polymer I | 0 | 20 | 40 | 50 | 60 | 80 | 100 |
| Viscosity (cSt/ ($\times 10^{-5}$ m$^2$/sec)), 0% water added | 310.2/ 31.02 | 226.7/ 22.67 | 184.6/ 18.46 | 160.8/ 16.08 | 135.5/ 13.55 | 94.9/ 9.49 | 72.9/ 7.29 |
| Appearance | Clear | Clear | Clear | Clear | Clear | Clear | Clear |
| Viscosity (cSt/ ($\times 10^{-5}$ m$^2$/sec)), 10% water added | 1358.7/ 135.87 | | 264.7/ 26.47 | 257.1/ 25.71 | 128.5/ 12.85 | 86.3/ 8.63 | 68.3/ 6.83 |

TABLE 4-continued

|  | wt. % | wt. % | wt. % | wt. % | wt. % | wt. % | wt. % |
|---|---|---|---|---|---|---|---|
| Appearance | Clear/Gel | Separated haze | Separated haze | Separated haze | Separated haze | Clear | Clear |
| Viscosity (cSt/ (×10⁻⁵ m²/sec)), 20% water added | — | — | — | — | — | — | 53.9/ 5.39 |
| Appearance | Separated clear gel | Separated cloudy gel | Cloudy gel | Haze | Separated haze | Separated haze | Clear |
| Viscosity (cSt/ (×10⁻⁵ m²/sec)), 30% water added | — | — | — | — | — | — | 34.2/ 3.42 |
| Appearance | Separated clear gel | Cloudy gel | Separated cloudy gel | Cloudy gel | Separated cloudy gel | Cloudy | Clear |
| Viscosity (cSt/ (×10⁻⁵ m²/sec)), 40% water added | — | — | — | — | — | — | 19.5/ 1.95 |
| Appearance | Separated cloudy gel | Separated haze gel | Cloudy gel | Milky gel | Separated cloudy gel | Separated cloudy | Slight haze |
| Viscosity (cSt/ (×10⁻⁵ m²/sec)), 50% water added | — | — | — | — | — | — | 15.9/ 1.59 |
| Appearance | Separated cloudy gel | Separated haze | Separated cloudy | Separated cloudy gel | Separated cloudy gel | Cloudy gel | Slight haze |

"—" denotes not determined.
"*" denotes a comparative composition, not part of the invention.

TABLE 5

|  | wt. % | wt. % | wt. % | wt. % | wt. % | wt. % | wt. % |
|---|---|---|---|---|---|---|---|
| Example 17 |  |  |  |  |  |  |  |
| Polymer J | 100* | 80 | 60 | 50 | 40 | 20* | 0* |
| Polymer D | 0 | 20 | 40 | 50 | 60 | 80 | 100 |
| Viscosity (cSt/(×10⁻⁵ m²/sec)), 0% water added | 197.2/ 19.72 | 149.5/ 14.95 | 114.8/ 11.48 | 114.7/ 11.47 | 100.6/ 10.06 | 87.3/ 8.73 | 52.2/ 5.22 |
| Appearance | Slight haze | Slight haze | Clear | Slight haze | Slight haze | Slight haze | Clear |
| Viscosity (cSt/(×10⁻⁵ m²/sec)), 10% water added | 269.8/ 26.98 | 164.6/ 16.46 | 123.5/ 12.35 | 100.9/ 10.09 | 88.7/ 8.87 | 67.2/ 6.72 | 53.5/ 5.35 |
| Appearance | Clear | Clear | Clear | Slight haze | Slight haze | Clear | Clear |
| Viscosity (cSt/(×10⁻⁵ m²/sec)), 20% water added | 313.1/ 31.31 | 168.2/ 16.82 | 104.9/ 10.49 | 91.4/ 9.14 | 72.5/ 7.25 | 54.7/ 5.47 | 43.8/ 4.38 |
| Appearance | Clear | Clear | Clear | Clear | Clear | Clear | Clear |
| Viscosity (cSt/(×10⁻⁵ m²/sec)), 30% water added | — | 146.2/ 14.62 | 86.4/ 8.64 | 70.3/ 7.03 | 58.7/ 5.87 | 40.9/ 4.09 | 32.9/ 3.29 |
| Appearance | Separated clear gel | Clear | Clear | Clear | Clear | Clear | Clear |
| Viscosity (cSt/(×10⁻⁵ m²/sec)), 40% water added | 671.0/ 67.10 | 121.0/ 12.10 | 70.0/ 7.00 | 60.0/ 6.00 | 40.1/ 4.01 | 28.7/ 2.87 | 29.5/ 2.95 |
| Appearance | Slight haze | Clear | Clear | Clear | Clear | Clear | Clear |
| Viscosity (cSt/(×10⁻⁵ m²/sec)), 50% water added | 141.6/ 14.16 | 97.8/ 9.78 | 80.7/ 8.07 | 40.9/ 4.09 | 24.4/ 2.44 | 26.7/ 2.67 | 18.9/ 1.89 |
| Appearance | Clear | Clear | Clear | Clear | Clear | Clear | Clear |

TABLE 5-continued

|  | wt. % | wt. % | wt. % | wt. % | wt. % | wt. % | wt. % |
|---|---|---|---|---|---|---|---|
| Example 18 | | | | | | | |
| Polymer J | 100* | 80 | 60 | 50 | 40 | 20* | 0* |
| Polymer I | 0 | 20 | 40 | 50 | 60 | 80 | 100 |
| Viscosity (cSt/(×10$^{-5}$ m$^2$/sec)), 0% water added | 197.2/ 19.72 | 158.7/ 15.87 | 131.9/ 13.19 | 118.8/ 11.88 | 106.8/ 10.68 | 86.8/ 8.68 | 72.8/ 7.28 |
| Appearance | Slight haze | Slight Haze | Slight haze | Clear | Clear | Clear | Clear |
| Viscosity (cSt/(×10$^{-5}$ m$^2$/sec)), 10% water added | 269.8/ 26.98 | 165.3/ 16.53 | 125.0/ 12.50 | 105.3/ 10.53 | 96.0/ 9.60 | 77.2/ 7.72 | 68.3/ 6.83 |
| Appearance | Clear | Clear | Clear | Clear | Clear | Clear | Clear |
| Viscosity (cSt/(×10$^{-5}$ m$^2$/sec)), 20% water added | 313.1/ 31.31 | 178.9/ 17.89 | 120.9/ 12.09 | 99.0/ 9.90 | 81.1/ 8.81 | 59.2/ 5.92 | 53.9/ 5.39 |
| Appearance | Clear | Clear | Clear | Clear | Clear | Clear | Clear |
| Viscosity (cSt/(×10$^{-5}$ m$^2$/sec)), 30% water added | — | 173.5/ 17.35 | 117.7/ 11.77 | 96.6/ 9.66 | 68.0/ 6.80 | 44.7/ 4.47 | 34.2/ 3.42 |
| Appearance | Separated clear gel | Clear | Clear | Clear | Clear | Clear | Clear |
| Viscosity (cSt/(×10$^{-5}$ m$^2$/sec)), 40% water added | 670.6/ 67.06 | 140.4/ 14.04 | 88.8/ 8.88 | 75.2/ 7.52 | 66.8/ 6.68 | 32.6/ 3.26 | 19.5/ 1.95 |
| Appearance | Slight haze | Clear | Clear | Clear | Clear | Clear | Slight haze |
| Viscosity (cSt/(×10$^{-5}$ m$^2$/sec)), 50% water added | 141.7/ 14.17 | 108.2/ 10.82 | 73.2/ 7.32 | 54.4/ 5.44 | 65.1/ 6.51 | — | 15.8/ 1.58 |
| Appearance | Clear | Clear | Clear | Clear | Clear | Clear | Slight haze |

"—" denotes was not determined.
"*" denotes a comparative composition, not part of the invention.

TABLE 6

| Example 19 | wt. % | wt. % | wt. % | wt. % | wt. % | wt. % | wt. % |
|---|---|---|---|---|---|---|---|
| Polymer M | 100* | 80* | 60* | 50 | 40 | 20* | 0* |
| Polymer D | 0 | 20 | 40 | 50 | 60 | 80 | 100 |
| Viscosity (cSt/(×10$^{-5}$ m$^2$/sec)), 0% water added | 248.7/ 24.87 | 113.0/ 11.30 | 134.9/ 13.49 | 119.6/ 11.96 | 102.6/ 10.26 | 76.0/ 7.60 | 52.2/ 5.22 |
| Appearance | Cloudy | Cloudy | Haze | Haze | Clear | Haze | Clear |
| Viscosity (cSt/(×10$^{-5}$ m$^2$/sec)), 10% water added | 301.3/ 30.13 | — | — | 119.2/ 11.92 | 97.7/ 9.77 | 73.2/ 7.32 | 53.5/ 5.35 |
| Appearance | Clear | Separated haze | Separated haze | Clear | Clear | Slight haze | Clear |
| Viscosity (cSt/(×10$^{-5}$ m$^2$/sec)), 20% water added | — | — | — | 105.6/ 10.56 | — | 61.7/ 6.17 | 43.8/ 4.38 |
| Appearance | Separated clear gel | Separated haze gel | Separated haze | Clear | Separated haze | Clear | Clear |
| Viscosity (cSt/(×10$^{-5}$ m$^2$/sec)), 30% water added | — | — | — | 79.2/ 7.92 | 112.7/ 11.27 | 63.8/ 6.38 | 32.9/ 3.29 |
| Appearance | Separated clear gel | Separated clear | Separated cloudy | Clear | Separated haze | Slight haze | Clear |
| Viscosity (cSt/(×10$^{-5}$ m$^2$/sec)), 40% water added | — | 400.3/ 40.03 | — | 59.6/ 5.96 | 45.3/ 4.53 | 37.9/ 3.79 | 29.5/ 2.95 |

TABLE 6-continued

| Example 19 | wt. % | wt. % | wt. % | wt. % | wt. % | wt. % | wt. % |
|---|---|---|---|---|---|---|---|
| Appearance | Separated clear | Clear | Separated haze | Clear | Slight haze | Haze | Clear |
| Viscosity (cSt/($\times 10^{-5}$ m²/sec)), 50% water added | — | — | 68.1/ 6.81 | 40.8/ 4.08 | 40.6/ 4.06 | 32.6/ 3.26 | 18.9/ 1.89 |
| Appearance | Separated clear | Separated clear | Separated haze | Clear | Clear | Clear | Clear |

"—" denotes not determined.

"*" denotes a comparative composition, not part of the invention.

TABLE 7

|  | wt. % | wt. % | wt. % | wt. % | wt. % | wt. % | wt. % |
|---|---|---|---|---|---|---|---|
| Example 20 |  |  |  |  |  |  |  |
| Polymer N | 100* | 80 | 60 | 50 | 40 | 20* | 0* |
| Polymer D | 0 | 20 | 40 | 50 | 60 | 80 | 100 |
| Viscosity (cSt/($\times 10^{-5}$ m²/sec)), 0% water added | 152/ 15.2 | 119.7/ 11.97 | 96.7/ 9.67 | 87.7/ 8.77 | 79.4/ 7.94 | 66.2/ 6.62 | 52.2/ 5.22 |
| Appearance | Clear | Clear | Clear | Clear | Clear | Clear | Clear |
| Viscosity (cSt/($\times 10^{-5}$ m²/sec)), 10% water added | 169.3/ 16.93 | 121/ 12.1 | 98.1/ 9.81 | 89.4/ 8.94 | 80.1/ 8.01 | 66.3/ 6.63 | 53.5/ 5.35 |
| Appearance | Clear | Clear | Clear | Clear | Clear | Clear | Clear |
| Viscosity (cSt/($\times 10^{-5}$ m²/sec)), 20% water added | Cloud Point at 40° C. | 114.3/ 11.43 | 98.9/ 9.89 | 81.5/ 8.15 | 67.4/ 6.74 | 52.5/ 5.25 | 43.8/ 4.38 |
| Appearance | Clear | Clear | Clear | Clear | Clear | Clear | Clear |
| Viscosity (cSt/($\times 10^{-5}$ m²/sec)), 30% water added | Cloud Point at 40° C. | Cloud Point at 40° C. | 97.3/ 9.73 | 75.6/ 7.56 | 59.2/ 5.92 | 41.2/ 4.12 | 32.9/ 3.29 |
| Appearance | Clear | Clear | Clear | Clear | Clear | Clear | Clear |
| Viscosity (cSt/($\times 10^{-5}$ m²/sec)), 40% water added | — | Cloud Point at 40° C. | Cloud Point at 40° C. | 26.3/ 2.63 | 49.7/ 4.97 | 29.35/ 2.94 | 29.5/ 2.95 |
| Appearance | Cloudy | Clear | Clear | Clear | Clear | Clear | Clear |
| Viscosity (cSt/($\times 10^{-5}$ m²/sec)), 50% water added | — | — | — | — | — | — | 18.85/ 1.89 |
| Appearance | Cloudy | Cloudy | Cloudy | Hazy | Hazy | Hazy | Clear |
| Comparative Example 21 |  |  |  |  |  |  |  |
| Polymer N | 100* | 80* | 60* | 50* | 40* | 20* | 0* |
| Polymer I | 0 | 20 | 40 | 50 | 60 | 80 | 100 |
| Viscosity (cSt/($\times 10^{-5}$ m²/sec)), 0% water added | 152/ 15.2 | 129.2/ 12.92 | 111.6/ 11.16 | 103.7/ 10.37 | 94.7/ 9.47 | 80.1/ 8.01 | 72.8/ 7.28 |
| Appearance | Clear | Clear | Clear | Clear | Clear | Clear | Clear |
| Viscosity (cSt/($\times 10^{-5}$ m²/sec)), 10% water added | 169.3/ 16.93 | — | — | — | — | 72.4/ 7.24 | 68.3/ 6.83 |
| Appearance | Clear | Cloudy | Cloudy | Hazy | Hazy | Clear | Clear |
| Viscosity (cSt/($\times 10^{-5}$ m²/sec)), 20% water added | Cloud Point at 40° C. | — | — | — | — | — | 53.9 |
| Appearance | Clear | Milky | Milky | Milky | Milky | Milky | Clear |
| Viscosity (cSt/($\times 10^{-5}$ m²/sec)), 30% water added | Cloud Point at 40° C. | — | — | — | — | — | 34.2/ 3.42 |

TABLE 7-continued

|  | wt. % | wt. % | wt. % | wt. % | wt. % | wt. % | wt. % |
|---|---|---|---|---|---|---|---|
| Appearance | Clear | Milky | Milky | Milky | Milky | Milky | Clear |
| Viscosity (cSt/(×10$^{-5}$ m$^2$/sec)), 40% water added | — | — | — | — | — | — | 19.5/ 1.95 |
| Appearance | Cloudy | Milky | Milky | Milky | Milky | Milky | Slight haze |
| Viscosity (cSt/(×10$^{-5}$ m$^2$/sec)), 50% water added | — | — | — | — | — | — | 15.9/ 1.59 |
| Appearance | Cloudy | Hazy | Hazy | Hazy | Hazy | Milky | Slight haze |

"—" denotes not determined.

"*" denotes a comparative composition, not part of the invention.

TABLE 8

|  | wt. % | wt. % | wt. % | wt. % | wt. % | wt. % | wt. % |
|---|---|---|---|---|---|---|---|
| Example 22 |  |  |  |  |  |  |  |
| Polymer O | 100* | 80 | 60 | 50 | 40 | 20* | 0* |
| Polymer D | 0* | 20 | 40 | 50 | 60 | 80 | 100 |
| Viscosity (cSt/(×10$^{-5}$ m$^2$/sec)), 0% water added | 154.9/ 15.49 | 127.9/ 12.79 | 101.5/ 10.15 | 99.7/ 9.97 | 87.2/ 8.72 | 65.3/ 6.53 | 52.2/ 5.22 |
| Appearance | Clear | Clear | Clear | Clear | Clear | Clear | Clear |
| Viscosity (cSt/(×10$^{-5}$ m$^2$/sec)), 10% water added | 195.2/ 19.52 | 130.8/ 13.08 | 107.1/ 10.71 | 90.5/ 9.05 | 85.7/ 8.57 | 63.5/ 6.35 | 53.5/ 5.35 |
| Appearance | Clear | Clear | Clear | Clear | Clear | Clear | Clear |
| Viscosity (cSt/(×10$^{-5}$ m$^2$/sec)), 20% water added | 276.9/ 27.69 | 135.02/ 13.50 | 90.15/ 9.02 | 74.84/ 7.84 | 64.86/ 6.49 | 63.13/ 6.31 | 43.8/ 4.38 |
| Appearance | Clear | Clear | Clear | Clear | Clear | Clear | Clear |
| Viscosity (cSt/(×10$^{-5}$ m$^2$/sec)), 30% water added | 362.5/ 36.25 | 134.1/ 13.41 | 81.9/ 8.19 | 65.5/ 6.55 | 57./ 5.77 | 41.2/ 4.12 | 32.93/ 3.29 |
| Appearance | Clear | Clear | Clear | Clear | Clear | Clear | Clear |
| Viscosity (cSt/(×10$^{-5}$ m$^2$/sec)), 40% water added | — | 113.2/ 11.32 | 62.2/ 6.22 | 84.5/ 8.45 | 62.9/ 6.29 | 31.9/ 3.19 | 29.5/ 2.95 |
| Appearance | Clear | Clear | Clear | Clear | Clear | Clear | Clear |
| Viscosity (cSt/(×10$^{-5}$ m$^2$/sec)), 50% water added | — | — | 68.9/ 6.89 | 44.4/ 4.44 | 31.8/ 3.18 | 21.3/ 2.13 | 18.9/ 1.89 |
| Appearance | Slight haze | Clear | Clear | Clear | Clear | Clear | Clear |
| Comparative Example 23 |  |  |  |  |  |  |  |
| Polymer O | 100* | 80* | 60* | 50* | 40* | 20* | 0* |
| Polymer I | 0 | 20 | 40 | 50 | 60 | 80 | 100 |
| Viscosity (cSt/(×10$^{-5}$ m$^2$/sec)), 0% water added | 154.9/ 15.49 | 132.6/ 13.26 | 114.7/ 11.47 | 105.8/ 10.58 | 96.8/ 9.68 | 82.6/ 8.26 | 72.8/ 7.28 |
| Appearance | Clear | Clear | Clear | Clear | Clear | Clear | Clear |
| Viscosity (cSt/(×10$^{-5}$ m$^2$/sec)), 10% water added | 195.2/ 19.52 | — | — | — | — | 82.5/ 8.25 | 68.3/ 6.83 |
| Appearance | Clear | Separated haze | Separated haze | Separated haze | Separated haze | Clear | Clear |
| Viscosity (cSt/(×10$^{-5}$ m$^2$/sec)), 20% water added | 276.9/ 27.69 | — | — | — | — | — | 53.9/ 5.39 |

TABLE 8-continued

|  | wt. % | wt. % | wt. % | wt. % | wt. % | wt. % | wt. % |
|---|---|---|---|---|---|---|---|
| Appearance | Clear | Separated haze | Separated cloudy | Separated cloudy | Separated cloudy | Separated haze | Clear |
| Viscosity (cSt/($\times 10^{-5}$ m$^2$/sec)), 30% water added | 362.5/ 36.25 | — | — | — | — | 73.3/ 7.33 | 34.2/ 3.42 |
| Appearance | Clear | Separated haze | Separated cloudy | Separated cloudy | Separated cloudy | Clear | Clear |
| Viscosity (cSt/($\times 10^{-5}$ m$^2$/sec)), 40% water added | — | — | — | — | — | — | 19.5/ 1.95 |
| Appearance | Clear | Separated cloudy | Separated cloudy | Separated cloudy | Separated cloudy | Separated cloudy | Slight haze |
| Viscosity (cSt/($\times 10^{-5}$ m$^2$/sec)), 50% water added | — | — | — | — | — | — | 15.9/ 1.59 |
| Appearance | Slight haze | Separated cloudy | Separated cloudy | Separated cloudy | Separated cloudy | Separated cloudy | Slight haze |

"—" denotes not determined.

"*" denotes a comparative composition, not part of the invention.

TABLE 9

|  | wt. % | wt. % | wt. % | wt. % | wt. % | wt. % | wt. % |
|---|---|---|---|---|---|---|---|
| Example 24 | | | | | | | |
| Polymer P | 100* | 80 | 60 | 50 | 40 | 20* | 0* |
| Polymer D | 0 | 20 | 40 | 50 | 60 | 80 | 100 |
| Viscosity (cSt/($\times 10^{-5}$ m$^2$/sec)), 0% water added | 220.3/ 22.03 | 164.5/ 16.45 | 146.8/ 14.68 | 133.2/ 13.32 | 115.6/ 11.56 | 81.1/ 8.11 | 52.2/ 5.22 |
| Appearance | Clear | Clear | Clear | Clear | Clear | Clear | Clear |
| Viscosity (cSt/($\times 10^{-5}$ m$^2$/sec)), 10% water added | 396.1/ 39.61 | 243.4/ 24.34 | 134.3/ 13.43 | 114.9/ 11.49 | 104.3/ 10.43 | 79.4/ 7.94 | 53.5/ 5.35 |
| Appearance | Clear | Clear | Clear | Clear | Clear | Clear | Clear |
| Viscosity (cSt/($\times 10^{-5}$ m$^2$/sec)), 20% water added | 629.3/ 62.93 | 311.5/ 31.15 | 158.9/ 15.89 | 118.9/ 11.89 | 95.7/ 9.57 | 88.4/ 8.84 | 43.8/ 4.38 |
| Appearance | Clear | Clear | Clear | Clear | Clear | Clear | Clear |
| Viscosity (cSt/($\times 10^{-5}$ m$^2$/sec)), 30% water added | — | — | 163.4/ 16.34 | 112.2/ 11.22 | 90.8/ 9.08 | 52.3/ 5.23 | 32.9/ 3.29 |
| Appearance | Clear | Clear | Clear | Clear | Clear | Clear | Clear |
| Viscosity (cSt/($\times 10^{-5}$ m$^2$/sec)), 40% water added | — | — | — | 62.8/ 6.28 | 81.6/ 8.16 | 42.1/ 4.21 | 29.5/ 2.95 |
| Appearance | Separated cloudy | Separated Cloudy | Separated hazy | Mild haze | Mild haze | Clear | Clear |
| Viscosity (cSt/($\times 10^{-5}$ m$^2$/sec)), 50% water added | — | — | — | — | — | — | 18.9/ 1.89 |
| Appearance | Separated cloudy | Separated Cloudy | Separated cloudy | Separated cloudy | Separated cloudy | Mild haze | Clear |
| Comparative Example 25 | | | | | | | |
| Polymer P | 100* | 80* | 60* | 50* | 40* | 20* | 0* |
| Polymer I | 0 | 20 | 40 | 50 | 60 | 80 | 100 |
| Viscosity (cSt/($\times 10^{-5}$ m$^2$/sec)), 0% water added | 220.3/ 22.03 | 172.2/ 17.22 | 134.5/ 13.45 | 128.3/ 12.83 | 114.5/ 11.45 | 94.02/ 9.40 | 72.8/ 7.28 |

TABLE 9-continued

|  | wt. % | wt. % | wt. % | wt. % | wt. % | wt. % | wt. % |
|---|---|---|---|---|---|---|---|
| Appearance | Clear | Clear | Clear | Clear | Clear | Clear | Clear |
| Viscosity (cSt/(×10⁻⁵ m²/sec)), 10% water added | 396.1/ 39.61 | — | 76.4/ 7.64 | — | — | 82.1/ 8.21 | 68.3/ 6.83 |
| Appearance | Clear | Separated haze | Clear | Separated haze | Separated haze | Clear | Clear |
| Viscosity (cSt/(×10⁻⁵ m²/sec)), 20% water added | 629.3/ 62.93 | — | — | — | — | — | 53.9/ 5.39 |
| Appearance | Clear | Separated milky | Separated haze | Separated cloudy | Separated haze | Separated haze | Clear |
| Viscosity (cSt/(×10⁻⁵ m²/sec)), 30% water added | — | — | — | — | — | — | 34.2/ 3.42 |
| Appearance | Clear | Thick milky | Separated milky | Separated cloudy | Separated haze | Separated haze | Clear |
| Viscosity (cSt/(×10⁻⁵ m²/sec)), 40% water added | — | — | — | — | — | — | 19.5/ 1.95 |
| Appearance | Separated cloudy | Separated milky | Thick Milky | Thick milky | Separated cloudy | Cloudy | Slight haze |
| Viscosity (cSt/(×10⁻⁵ m²/sec)), 50% water added | — | — | — | — | — | — | 15.9/ 1.59 |
| Appearance | Separated cloudy | Separated milky | Thick Milky | Thick milky | Separated milky | Separated cloudy | Slight haze |

"—" denotes not determined.
"*" denotes a comparative composition, not part of the invention.

TABLE 10

|  | wt. % | wt. % | wt. % | wt. % | wt. % | wt. % | wt. % |
|---|---|---|---|---|---|---|---|
| Example 26 | | | | | | | |
| Polymer B | 100* | 80 | 60 | 50 | 40 | 20* | 0* |
| Polymer D | 0 | 20 | 40 | 50 | 60 | 80 | 100 |
| Viscosity (cSt/(×10⁻⁵ m²/sec)), 0% water added | 254.5/ 25.45 | 189.4/ 18.94 | 137.9/ 1379 | 116.9/ 11.69 | 100.0/ 10.0 | 72.9/ 7.29 | 52.2/ 5.22 |
| Appearance | Clear | Clear | Clear | Clear | Clear | Clear | Clear |
| Viscosity (cSt/(×10⁻⁵ m²/sec)), 10% water added | 365.9/ 36.59 | 218.3/ 21.83 | 155.2/ 15.52 | 120.3/ 12.03 | 99.2/ 9.92 | 71.9/ 7.19 | 53.5/ 5.35 |
| Appearance | Clear | Slight haze | Clear | Clear | Clear | Clear | Clear |
| Viscosity (cSt/(×10⁻⁵ m²/sec)), 20% water added | — | 390.9/ 39.09 | 165.6/ 16.56 | 121.7/ 12.17 | 93.9/ 9.39 | 59.9/ 5.99 | 43.8/ 4.38 |
| Appearance | Thick haze | Clear | Clear | Clear | Clear | Clear | Clear |
| Viscosity (cSt/(×10⁻⁵ m²/sec)), 30% water added | — | — | 171.1/ 17.11 | 118.9/ 11.89 | 83.1/ 8.31 | 45.9/ 4.59 | 32.9/ 3.29 |
| Appearance | Thick haze | Separated clear | Clear | Clear | Clear | Clear | Clear |
| Viscosity (cSt/(×10⁻⁵ m²/sec)), 40% water added | — | — | 164.5/ 16.45 | 119.1/ 11.91 | 72.6/ 7.26 | 31.5/ 3.15 | 29.5/ 2.95 |
| Appearance | Thick haze | Separated clear | Slight haze | Clear | Clear | Clear | Clear |
| Viscosity (cSt/(×10⁻⁵ m²/sec)), 50% water added | — | — | — | 114.9/ 11.49 | 73.4/ 7.34 | 21.1/ 2.11 | 18.9/ 1.89 |

TABLE 10-continued

|  | wt. % | wt. % | wt. % | wt. % | wt. % | wt. % | wt. % |
|---|---|---|---|---|---|---|---|
| Appearance | Haze | Haze | Slight haze | Slight haze | Slight haze | Clear | Clear |
| Comparative Example 27 | | | | | | | |
| Polymer B | 100* | 80* | 60* | 50* | 40* | 20* | 0* |
| Polymer I | 0 | 20 | 40 | 50 | 60 | 80 | 100 |
| Viscosity (cSt/($\times 10^{-5}$ m$^2$/sec)), 0% water added | 254.5/ 25.45 | 188.9/ 18.89 | 154.2/ 15.42 | 161.5/ 16.15 | 117.8/ 11.78 | 97.2/ 9.72 | 72.8/ 7.28 |
| Appearance | Clear | Clear | Clear | Clear | Slight haze | Clear | Clear |
| Viscosity (cSt/($\times 10^{-5}$ m$^2$/sec)), 10% water added | 365.9/ 36.59 | — | — | — | — | 186.9/ 18.69 | 68.3/ 6.83 |
| Appearance | Clear | Separated haze | Separated haze | Separated haze | Separated haze | Clear | Clear |
| Viscosity (cSt/($\times 10^{-5}$ m$^2$/sec)), 20% water added | — | — | — | — | — | — | 53.9/ 5.39 |
| Appearance | Thick haze | Separated cloudy | Separated haze | Separated haze | Separated haze | Separated haze | Clear |
| Viscosity (cSt/($\times 10^{-5}$ m$^2$/sec)), 30% water added | — | — | — | — | — | — | 34.2/ 3.42 |
| Appearance | Thick haze | Separated cloudy | Separated cloudy | Separated haze | Separated cloudy | Separated haze | Clear |
| Viscosity (cSt/($\times 10^{-5}$ m$^2$/sec)), 40% water added | — | — | — | — | — | — | 19.5/ 1.95 |
| Appearance | Thick haze | Separated cloudy | Separated milky gel | Separated cloudy | Separated cloudy | Separated haze | Slight haze |
| Viscosity (cSt/($\times 10^{-5}$ m$^2$/sec)), 50% water added | — | — | — | — | — | — | 15.9/ 1.59 |
| Appearance | Haze | Separated cloudy | Separated milky gel | Separated cloudy | Separated milky | Separated cloudy | Slight haze |

"—" denotes not determined.
"*" denotes a comparative composition, not part of the invention.

TABLE 11

|  | wt. % | wt. % | wt. % | wt. % | wt. % | wt. % | wt. % |
|---|---|---|---|---|---|---|---|
| Comparative Example 28 | | | | | | | |
| Polymer S | 100* | 80* | 60* | 50* | 40* | 20* | 0* |
| Polymer D | 0 | 20 | 40 | 50 | 60 | 80 | 100 |
| Viscosity (cSt/($\times 10^{-5}$ m$^2$/sec)), 0% water added | 293.9/ 29.39 | 204.1/ 20.41 | 149.5/ 14.95 | 126.8/ 12.68 | 106.8/ 10.68 | 80.4/ 8.04 | 52.2/ 5.22 |
| Appearance | Clear | Clear | Clear | Clear | Clear | Clear | Clear |
| Viscosity (cSt/($\times 10^{-5}$ m$^2$/sec)), 10% water added | 309.5/ 30.95 | — | — | 127.3/ 12.73 | 106/ 10.60 | 77.6/ 7.76 | 53.5/ 5.35 |
| Appearance | Clear | Haze | Haze | Clear | Clear | Clear | Clear |
| Viscosity (cSt/($\times 10^{-5}$ m$^2$/sec)), 20% water added | — | — | — | — | — | 65.9/ 6.59 | 43.8/ 4.38 |
| Appearance | Separated cloudy | Separated cloudy | Separated cloudy | Separated haze | Separated haze | Clear | Clear |
| Viscosity (cSt/($\times 10^{-5}$ m$^2$/sec)), 30% water added | — | — | — | — | — | — | 32.9/ 3.29 |

TABLE 11-continued

|  | wt. % | wt. % | wt. % | wt. % | wt. % | wt. % | wt. % |
|---|---|---|---|---|---|---|---|
| Appearance | Separated cloudy | Separated cloudy | Separated cloudy | Separated cloudy | Separated cloudy | Separated cloudy | Clear |
| Viscosity (cSt/(×10⁻⁵ m²/sec)), 40% water added | — | — | — | — | — | — | 29.5/ 2.95 |
| Appearance | Separated cloudy | Separated cloudy | Separated cloudy | Separated haze | Separated haze | Separated cloudy | Clear |
| Viscosity (cSt/(×10⁻⁵ m²/sec)), 50% water added | — | — | — | — | — | — | 18.9/ 1.89 |
| Appearance | Separated cloudy | Separated cloudy | Separated cloudy | Separated cloudy | Separated cloudy | Separated cloudy | Clear |
| *Example 29* | | | | | | | |
| Polymer S | 100* | 80* | 60* | 50* | 40 | 20* | 0* |
| Polymer I | 0 | 20 | 40 | 50 | 60 | 80 | 100 |
| Viscosity (cSt/(×10⁻⁵ m²/sec)), 0% water added | 293.9/ 29.39 | 224.9/ 22.49 | 173.9/ 17.39 | 152.1/ 15.21 | 134.6/ 13.46 | 96.9/ 9.69 | 72.8/ 7.28 |
| Appearance | Clear | Clear | Clear | Clear | Clear | Clear | Clear |
| Viscosity (cSt/(×10⁻⁵ m²/sec)), 10% water added | 309.5/ 30.95 | — | — | — | 159.6/ 15.96 | 94.3/ 9.43 | 68.3/ 6.83 |
| Appearance | Clear | Separated cloudy | Separated haze | Separated haze | Mild haze | Clear | Clear |
| Viscosity (cSt/(×10⁻⁵ m²/sec)), 20% water added | — | — | — | — | — | — | 53.9/ 5.39 |
| Appearance | Separated cloudy | Separated cloudy | Cloudy | Separated cloudy | Separated cloudy | Separated haze | Clear |
| Viscosity (cSt/(×10⁻⁵ m²/sec)), 30% water added | — | — | — | — | — | — | 34.2/ 3.42 |
| Appearance | Separated cloudy | Separated cloudy | Separated cloudy | Separated cloudy | Cloudy | Cloudy | Clear |
| Viscosity (cSt/(×10⁻⁵ m²/sec)), 40% water added | — | — | — | — | — | — | 19.5/ 1.95 |
| Appearance | Separated cloudy | Separated cloudy | Separated cloudy | Cloudy | Cloudy | Cloudy | Slight haze |
| Viscosity (cSt/(×10⁻⁵ m²/sec)), 50% water added | — | — | — | — | — | — | 15.9/ 1.59 |
| Appearance | Separated cloudy | Separated cloudy | Separated cloudy | Separated cloudy | Cloudy | Separated cloudy | Slight haze |

"—" denotes not determined.

TABLE 12

|  | wt. % | wt. % | wt. % | wt. % | wt. % | wt. % |
|---|---|---|---|---|---|---|
| *Example 30* | | | | | | |
| Polymer R | 100* | 80 | 60 | 50 | 40 | 20* | 0* |
| Polymer D | 0 | 20 | 40 | 50 | 60 | 80 | 100 |
| Viscosity (cSt/(×10⁻⁵ m²/sec)), 0% water added | 351.4/ 35.14 | 242.7/ 24.27 | 170.2/ 17.02 | 143.9/ 14.39 | 127.5/ 12.75 | 79.1/ 7.91 | 52.2/ 5.22 |
| Appearance | Clear | Clear | Clear | Clear | Clear | Clear | Clear |
| Viscosity (cSt/(×10⁻⁵ m²/sec)), 10% water added | — | 352.6/ 35.26 | 196.9/ 19.69 | 152.9/ 15.29 | 122.0/ 12.20 | 81.0/ 8.10 | 53.5/ 5.35 |

TABLE 12-continued

| | wt. % | wt. % | wt. % | wt. % | wt. % | wt. % |
|---|---|---|---|---|---|---|
| Appearance | Cloudy | — | — | — | — | Clear |
| Viscosity (cSt/(×10⁻⁵ m²/sec)), 20% water added | — | 778.6/ 77.86 | 238.7/ 23.87 | 187.2/ 18.72 | 136.5/ 13.65 | 82.1/ 8.21 | 43.8/ 4.38 |
| Appearance | Clear separated gel | — | — | — | — | Clear |
| Viscosity (cSt/(×10⁻⁵ m²/sec)), 30% water added | — | — | — | — | 134.8/ 13.48 | — | 32.9/ 3.29 |
| Appearance | Haze gel | Separated cloudy | Haze | Separated haze | Haze | — | Clear |
| Viscosity (cSt/(×10⁻⁵ m²/sec)), 40% water added | — | — | — | — | — | — | 29.5/ 2.95 |
| Appearance | Separated milky gel | Separated milky | Cloudy | Separated cloudy | Separated cloudy | Separated cloudy | Clear |
| Viscosity (cSt/(×10⁻⁵ m²/sec)), 50% water added | — | — | — | — | — | — | 18.9/ 1.89 |
| Appearance | Milky gel | Milky gel | Separated milky | Separated cloudy | Separated cloudy | Separated cloudy | Clear |
| Comparative Example 31 | | | | | | |
| Polymer R | 100* | 80* | 60* | 50* | 40* | 20* | 0* |
| Polymer I | 0 | 20 | 40 | 50 | 60 | 80 | 100 |
| Viscosity (cSt/(×10⁻⁵ m²/sec)), 0% water added | 350.9/ 35.09 | 248.6/ 24.86 | 211.1/ 21.11 | 179.1/ 17.91 | 286.3/ 28.63 | 130.2/ 13.02 | 72.8/ 7.28 |
| Appearance | Clear | Clear | Clear | Haze | Haze | Haze | Clear |
| Viscosity (cSt/(×10⁻⁵ m²/sec)), 10% water added | 835.4/ 83.54 | — | — | — | — | 101.3/ 10.13 | 68.3/ 6.83 |
| Appearance | Cloudy | Cloudy/Gel | Separated cloudy gel | Separated haze | Haze | Haze | Clear |
| Viscosity (cSt/(×10⁻⁵ m²/sec)), 20% water added | — | — | — | — | — | — | 53.9/ 5.39 |
| Appearance | Cloudy/Gel | Cloudy/Gel | Thick milky gel | Separated milky | Haze | Cloudy | Clear |
| Viscosity (cSt/(×10⁻⁵ m²/sec)), 30% water added | — | — | — | — | — | — | 34.2/ 3.42 |
| Appearance | Cloudy/Gel | Separated Milky gel | milky gel | Separated milky | Separated milky | Cloudy | Clear |
| Viscosity (cSt/(×10⁻⁵ m²/sec)), 40% water added | — | — | — | — | — | — | 19.5/ 1.95 |
| Appearance | Cloudy/Gel | Milky gel | Milky gel | Separated milky | Separated milky | Cloudy | Slight haze |
| Viscosity (cSt/(×10⁻⁵ m²/sec)), 50% water added | — | — | — | — | — | — | 15.9/ 1.59 |
| Appearance | Cloudy/Gel | Milky gel | Milky gel | Milky | Separated milky gel | Cloudy | Slight haze |

"—" denotes not determined.

Prepare a representative blend of Polymer J and Polymer D. The composition includes 18.6 wt. percent of Polymer D, 80 wt. percent of Polymer J and 1.4 wt. percent of an additive package comprising 0.9 wt. percent Irgacor® L17, 0.25 wt. percent Irgacor® L06, and 0.25 wt. percent a reaction product of N-phenylbenzenamine with 2,4,4-trimethyl pentene and 2-methylpropene (Vanlube™ 961), each wt. percent being based upon total composition weight. Irgacor is a trademark of the Ciba Geigy Corporation. Vanlube is a trademark of the R.T. Vanderbilt Company, Inc. The viscosity of this formulated blend is determined in deionized water and in synthetic seawater (prepared according to ASTM D665). The composition performs well in deionized water up to a water content of 40 wt. percent, based upon combined weight of composition and deionized water. The viscosity in synthetic seawater increases when sea water is present and remains acceptable at water concentrations of 50 wt. percent, based upon combined weight of composition and synthetic seawater. These results are summarized in Table 13.

TABLE 13

| Example | Water Content | Viscosity (Deionized Water), cSt/($\times 10^{-5}$ m$^2$/sec)) | Viscosity (Seawater), cSt/($\times 10^{-5}$ m$^2$/sec) |
|---|---|---|---|
| 32 | 0 | 157.9/15.79 | 157.9/15.79 |
| 33 | 10 | 163/16.3 | 201/20.1 |
| 34 | 20 | 168/16.8 | 209/20.9 |
| 35 | 30 | 146/14.6 | 207/20.7 |
| 36 | 40 | 123/12.3 | 159/15.9 |
| 37 | 50 | 95/9.5 | 159/15.9 |

These examples show that compositions of random and block copolymers can be utilized to provide good rheology control when aqueous dilutions of the compositions are formed. Rheology control depends on several factors such as the molecular weight ($M_w$) and ethylene oxide content of the random copolymer and also the molecular weight ($M_w$) and propylene oxide content of the block copolymer. Furthermore, the weight ratios of random and block copolymers can be used to optimize and control rheology performance in aqueous solution. Block copolymers which contain ≧70 wt. % PO content and $M_w$'s of from 1500 g/mol to 4000 g/mol are preferred. Random copolymers containing 50 wt. % EO units and having $M_w$'s of less than 2000 g/mol, particularly from 500 g/mol to 1200 g/mol, are also preferred.

Compositions which contain only random copolymers of EO and PO, for example Polymers E (Comparative Example 4) or I (Comparative Examples 3 and 13), show poor rheology control and significant viscosity decrease when 50 wt. % water is present in the composition. Furthermore, compositions which contain only block copolymers, also show poor rheology control and a significant increase in viscosity on water addition such that gel formation occurs. This is exemplified with Polymer Q in Table 4 which forms a gel at 50 wt. % aqueous dilution.

Compositions of random copolymers and block copolymers can provide the desired rheology control. Some compositions which contain 50 wt. % random copolymer and 50 wt. % block copolymer show excellent rheology control. For example, a composition which contains 50 wt. % Polymer Q and 50 wt. % Polymer D in Table 4 shows less than 6 percent viscosity change with 50 wt. % water addition. Similarly Example 2 in Table 1, which describes a composition containing block copolymer B at 50 wt. % with random copolymers C and D at 10 wt. % and 40 wt. %, respectively, shows less than 13 percent viscosity change when combined with 50 wt. % water.

The EO content of the random copolymer is important when considering the stability of compositions that contain block copolymers in the presence of water. When the level of EO in the random component is too high, aqueous compositions are often hazy, cloudy or milky in appearance. When the EO content of the random copolymer is from 50 wt. % to 55 wt. %, compositions that contain block copolymers can lead to clear stable aqueous solutions, as illustrated by Polymers Q and D (Ex 15) in Table 4.

What is claimed is:

1. A polymer composition, comprising:
a) from 15 weight percent to 60 weight percent, based upon composition weight, of one or more random ethylene oxide/propylene oxide interpolymers, each of which has a weight average molecular weight ranging from 250 g/mol to 2000 g/mol and comprises from 30 weight percent to 60 weight percent, based upon random interpolymer weight, of polymer units derived from ethylene oxide; and
b) from 40 weight percent to 85 weight percent, based upon composition weight, of one or more ethylene oxide/propylene oxide block interpolymers, each of which has a weight average molecular weight ranging from 1500 g/mol to 4000 g/mol and comprises from 40 weight percent to 90 weight percent, based upon block copolymer weight, of blocks derived from propylene oxide;
wherein the composition is substantially free of water;
wherein the composition has a first viscosity in the substantial absence of water and a second viscosity in the presence of an amount of water, the first viscosity ranging from 50 centistokes to 120 centistokes and
wherein the second viscosity, when the amount of water present is at least 10 weight percent and up to 50 weight percent based upon combined weight of composition and water, has a value that is at least 60 percent of the value of the first viscosity, wherein the first and second viscosities are determined according to ASTM D-445 at 40° C.

2. The polymer composition according to claim 1, wherein each random ethylene oxide/propylene oxide interpolymer has a weight average molecular weight ranging from 250 g/mol to 1200 g/mol.

3. The polymer composition according to claim 1, wherein the one or more random ethylene oxide/propylene oxide interpolymers comprise from 40 weight percent to 60 weight percent of the composition.

4. The polymer composition according to claim 3, wherein the one or more random ethylene oxide/propylene oxide interpolymers comprise 50 weight percent to 55 weight percent of the composition.

5. The polymer composition according to claim 1, wherein the one or more ethylene oxide/propylene oxide block interpolymers comprises from 50 weight percent to 75 weight percent of the composition.

6. The polymer composition according to claim 1, wherein the one or more ethylene oxide/propylene oxide block interpolymers comprise 40 weight percent to 60 weight percent of the composition.

7. The polymer composition according to claim 1, wherein each of the one or more ethylene oxide/propylene oxide block interpolymers comprises from 10 weight percent to less than 50 weight percent, based upon block copolymer weight, of polymer units derived from ethylene oxide.

8. The polymer composition according to claim 1, wherein each of the one or more ethylene oxide/propylene oxide block interpolymers has a weight average molecular weight ranging from 1750 g/mol to 2500 g/mol.

9. The polymer composition according to claim 1, wherein each random ethylene oxide/propylene oxide interpolymer has a weight average molecular weight ranging from 250 g/mol to 1200 g/mol; and
wherein each ethylene oxide/propylene oxide block interpolymer has a weight average molecular weight ranging from 1750 g/mol to 2500 g/mol.

10. The composition of claim 1, wherein the second viscosity ranges from 0 percent greater to less than 11 percent greater than the first viscosity when the amount of water present is 5 weight percent.

11. The composition of claim 1, wherein the composition comprises less than 0.5 weight percent of one or more alcohol alkoxylates.

12. A method of lubricating a surface, which method comprises providing the polymer composition of claim 1 to the surface.

13. The method of claim 12, wherein the surface is selected from a stern tube bearing of a marine vessel or a fin stabilizer bearing of a marine vessel.

14. A method of lubricating bearings in a marine vessel, the method comprising providing to the bearings a polymer composition, comprising:
   a) from 15 weight percent to 60 weight percent, based upon composition weight, of one or more random ethylene oxide/propylene oxide interpolymers, each of which has a weight average molecular weight ranging from 250 g/mol to 2000 g/mol and comprises from 30 weight percent to 60 weight percent, based upon random interpolymer weight, of polymer units derived from ethylene oxide; and
   b) from 40 weight percent to 85 weight percent, based upon composition weight, of one or more ethylene oxide/propylene oxide block interpolymers, each of which has a weight average molecular weight ranging from 1500 g/mol to 4000 g/mol and comprises from 40 weight percent to 90 weight percent, based upon block copolymer weight, of blocks derived from propylene oxide;
   wherein the composition has a first viscosity in the substantial absence of water and a second viscosity in the presence of an amount of water, the first viscosity ranging from 50 centistokes to 120 centistokes and
   wherein the second viscosity, when the amount of water present is at least 10 weight percent and up to 50 weight percent based upon combined weight of composition and water, has a value that is at least 60 percent of the value of the first viscosity, wherein the first and second viscosities are determined according to ASTM D-445 at 40° C.

* * * * *